United States Patent
Furlani et al.

Patent Number: 6,134,193
Date of Patent: Oct. 17, 2000

[54] TRANSLATIONAL, BIAS-FIELD DEVICE FOR A MAGNETO-OPTICAL SYSTEM

[75] Inventors: Edward P. Furlani, Lancaster; Christopher C. Williams, Livonia; Charles E. Brugger; Syamal K. Ghosh, both of Rochester, all of N.Y.

[73] Assignee: Eastman Kodak Company, Rochester, N.Y.

[21] Appl. No.: 09/059,957

[22] Filed: Apr. 14, 1998

[51] Int. Cl.⁷ .................................................. G11B 11/00
[52] U.S. Cl. ............................................................ 369/13
[58] Field of Search .............................. 369/13, 14, 116, 369/110, 112; 300/114, 59; 365/122

[56] References Cited

U.S. PATENT DOCUMENTS

| | | | |
|---|---|---|---|
| 5,590,096 | 12/1996 | Ohtsuka et al. | 369/13 |
| 5,619,479 | 4/1997 | Furlani et al. | 369/13 |
| 5,710,745 | 1/1998 | Getreuer | 369/13 |
| 5,768,220 | 6/1998 | Williams et al. | 369/13 |
| 5,777,952 | 7/1998 | Nishimura et al. | 369/13 |

*Primary Examiner*—Tan Dinh
*Attorney, Agent, or Firm*—Peyton C. Watkins

[57] ABSTRACT

A translational, bias-field device for a magneto-optical system having a magneto-optical recording element moving through a magnetic field created by the bias-field device so that information can be selectively recorded on or erased from the recording element, the device comprises a housing and a first rail for enabling translational movement attached to the housing. A permanent magnet is positioned adjacent the recording element for providing the magnetic field to the recording element, and is attached to the first rail which enables translational movement of the magnet. A mechanical driver is attached to the magnet which driver imparts movement the permanent magnet.

7 Claims, 4 Drawing Sheets

TRANSLATIONAL, BIAS-FIELD DEVICE FOR A MAGNETO-OPTICAL SYSTEM

CROSS-REFERENCE TO RELATED APPLICATIONS

The present application is related to U.S. Pat. No. 5,710,747, filed Dec. 12, 1996, by Edward P. Furlani et al., and entitled, "DUAL COIL, TRANSLATIONAL BIAS-FIELD DEVICE FOR A MAGNETO-OPTICAL SYSTEM."

FIELD OF THE INVENTION

The invention relates generally to the field of magneto-optic recording and erasing and, more particularly, to such recording and erasing utilizing a translational, bias-field device for inverting a bias field for permitting recording and erasure.

BACKGROUND OF THE INVENTION

In the magneto-optic recording process, a vertically magnetizable recording layer is initially sensitized by simultaneously subjecting it to a uniform magnetic field and a temperature which exceeds its Curie temperature (e.g., 400 degrees C.). The magnetic field, being directed perpendicular to the recording layer, serves to uniformly align all of the magnetic domains therewith. Once all the magnetic domains are facing in the same direction, the recording layer is ready to record information. Such recording is effected by subjecting the recording layer to a magnetic field of reverse polarity while scanning the layer with an intensity-modulated laser beam. During the recording process, a laser beam intensity is switched between high and low levels, representing the digital (binary) information being recorded. Only the high level is sufficiently intense to raise the temperature of the irradiated portion of the recording layer to above its Curie temperature; thus, digital information is recorded at the point of incidence of the laser as the more intensely irradiated magnetic domains flip in orientation to align themselves with the magnetic bias field. Playback of the recorded information is commonly achieved by scanning the information tracks with a plane-polarized beam of radiation and monitoring the reflected beam for shifts in the plane of polarization, as produced by the well known Kerr effect. To erase the recorded information, the polarity of the applied external magnetic field is reversed, and the recording layer is scanned with a beam of sufficient intensity to again heat the recording layer to above its Curie temperature. After this erasure step, all of the irradiated magnetic domains will again face in the same direction. Various schemes have been proposed to achieve the magnetic field inversions required in switching between the record and erase modes of the magneto-optic recording process. In the disclosure of U.S. Pat. No. 5,710,747, for example, the field inversion apparatus consists of a permanent magnet induced for movement by a magnetic field produced by electrical coils.

Although the presently known and utilized device is satisfactory, it is not without drawbacks. The coils are positioned directly beneath the recording layer so that heat generated from coils passes upwardly toward the recording layer. Since the digital information is recorded by heat intensity of the laser beam, extraneous heat sources near the recording layer may be undesirable.

Consequently, a need exists in the construction and mode of operating the bias-field device so as to overcome the above-described drawbacks.

SUMMARY OF THE INVENTION

It is an object of the present invention to overcome the above-described drawbacks.

It is an advantage of the present invention to provide a bias-field device which is efficient to produce.

It is a feature of the present invention to provide a permanent magnet positioned adjacent the recording element for providing the magnetic field to the recording element, and attached to two rails which enable lateral translational movement to the magnet when the magnet is moved with an external actuator or mechanical driver, and which maintain the position of the magnet in other directions.

SUMMARY OF THE INVENTION

The present invention is directed to overcoming one or more of the problems set forth above. Briefly summarized according to one aspect of the invention, the invention resides in a translational, bias-field device for a magneto-optical system having a magneto-optical recording element moving through a magnetic field created by the bias-field device so that information can be selectively recorded on or erased from the recording element, the device comprising: (a) a housing; (b) a first rail for enabling translational movement attached to said housing; (c) a permanent magnet positioned adjacent the recording element for providing the magnetic field to the recording element, and attached to said first rail which enables translational movement of said magnet; and (d) a mechanical driver attached to said magnet which driver imparts movement said permanent magnet.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
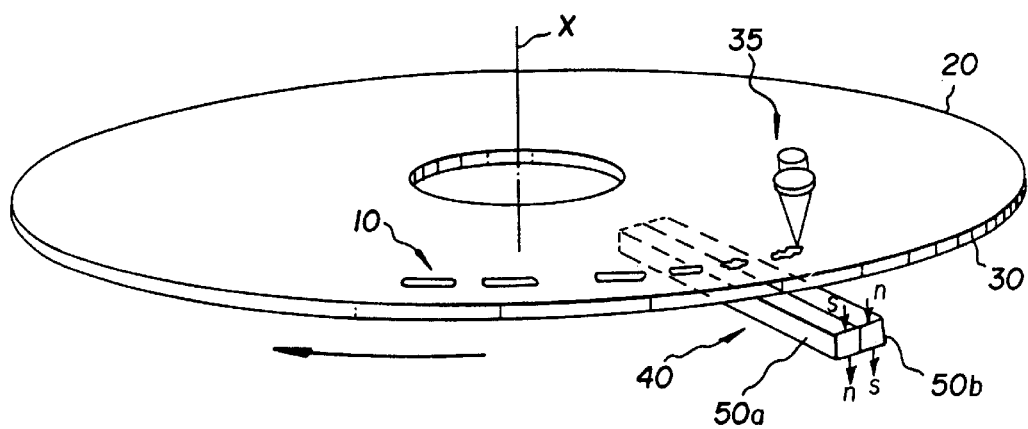
FIG. 1 is a perspective view of a recording medium having the bias-field device of the present invention.

Referring to FIG. 1, there is illustrated a magneto-optic recording element as shown in the form of a disk 10 which is adapted to be rotated about its central axis x. The essential features of the recording element are a vertically magnetizable recording layer 20 and a supporting substrate 30. During the recording step, the recording layer 20 is selectively heated by a beam of radiation, as provided by a laser source 35. The beam intensity is modulated by an information source (not shown) representing certain digital information which is to be recorded. The information source functions to switch the beam intensity of the laser source 35 between high and low levels, only the high level being sufficient to heat the recording layer 20 to at least its Curie temperature. A bias field device 40 includes two abutting, rectangular-shaped magnets 50a and 50b both having north and south poles oriented along their cross-sectional dimension, and is radially disposed with respect to the rotating disk 10 for providing a magnetic bias-field at recording layer 20. The magnets 50a and 50b are mounted for translational movement, as will be described in detail below, so that the direction of the field under the desired location on the recording medium 10 may be switched from the downward direction in which magnet 50a is beneath the write/erase spot on recording layer 20 to an upward direction in which the bias-field device 40 is translationally moved so that magnet 50b is beneath the write/erase spot on recording layer 20. The magnets 50a and 50b will cause magnetic domains in the recording element to flip orientations, e.g., from upward to downward, whenever the laser beam intensity is at its high level. In this manner, the digital information provided by the laser source 35 is magnetically recorded in the recording layer 20. To erase the previously recorded information in the recording layer 20, the direction of the magnetic bias field is inverted. After such field inversion, the laser source 35 scans the recording element while its intensity is maintained at its high level. While so radiated, all of the magnetic domains align themselves with the bias field thereby providing a uniformly sensitized disk or track which is again ready to record information.

Figure 2:
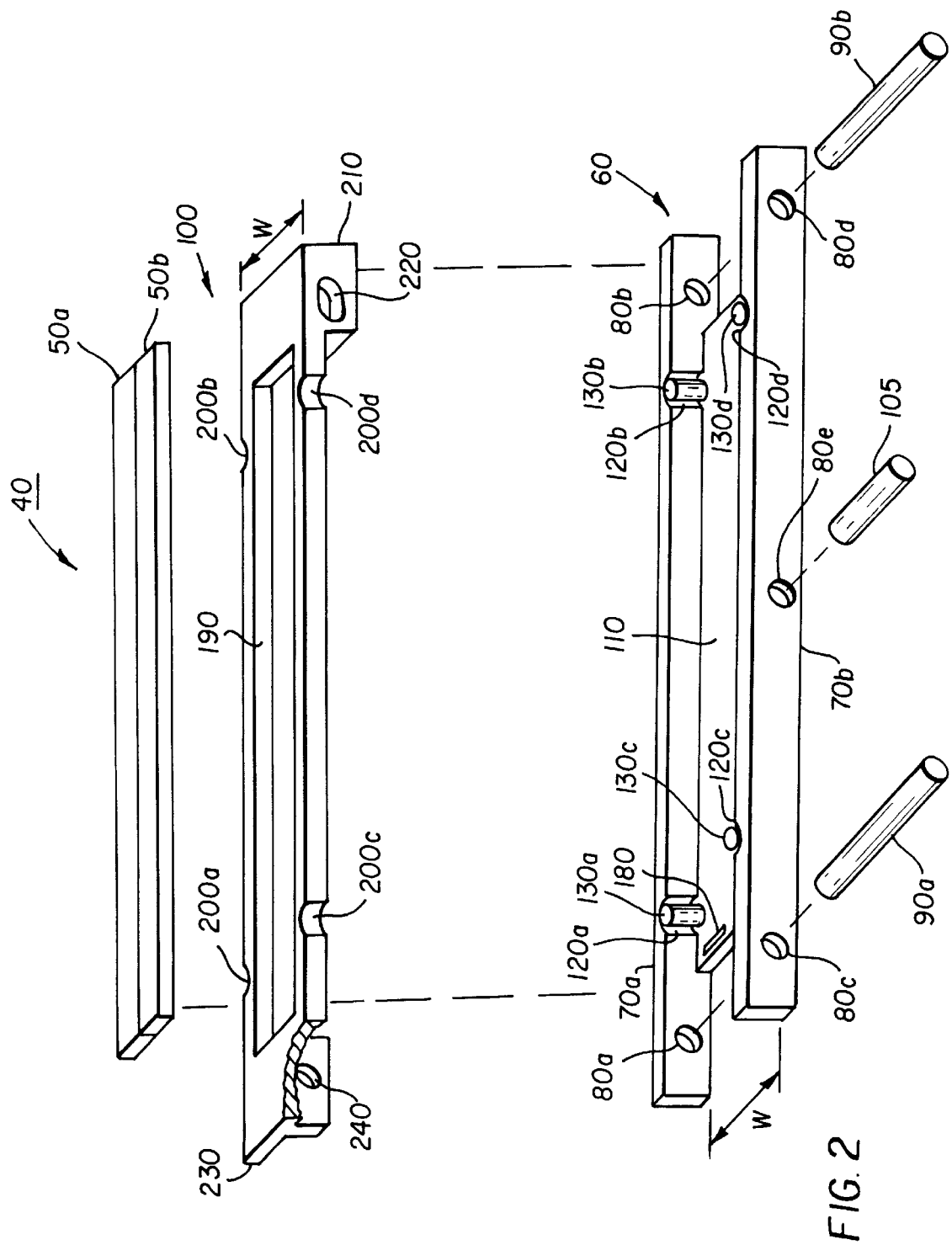
FIG. 2 is a perspective view of the bias-field device illustrating its assembly.

Referring to FIG. 2, the bias-field device 40 is shown in detail. The device 40 includes a housing having two metallic sides 70a and 70b positioned in a substantially parallel, spaced-apart relationship. Each side 70a and 70b contains two spaced-apart holes 80 with the holes 80a and 80b on side 70a respectively aligned in registry with the holes 80c and 80d on the other side 70b for permitting each pair of aligned holes (i.e., 80a to 80c and 80b to 80d) to receive a rail 90 for permitting the housing 60 to be attached to a plastic portion 100, as will be described in detail below. A third hole 80e is disposed in the side 70b for receiving a shaft 105 of an actuator or mechanical driver (shown in FIG. 3), which shaft is integrally attached to the plastic portion 100 when assembled. A metallic housing bottom 110 rests between the sides 70, and is integrally formed with the sides 70 so as to form one solid portion or may be attached to the sides 70 at their lower portion by a suitable metallic adhesive or fasteners. The bottom 110 maintains a width (W) between the two sides 70. Each side 70 contains two spaced-apart, notched-out portions 120 having the same spacing on both sides 70. A metal post 130 is disposed in each notch 120 for attracting the magnets 50a and 50b when they are positioned in the housing 60, as will later become more apparent. The low friction plastic 100, such as lubricated polycarconate (such as that manufactured by Engineering Plastics Corporation), includes a hollowed-out center portion 190 which receives the magnets 55a and 55b as the plastic portion 100 is placed onto the housing 60. It is instructive to note that the plastic portion 100 is smaller in width ($W_1$) than the width (W) of the housing 60 so the lateral movement is permitted. The plastic portion 100 includes four pockets 200 respectively positioned to correspond to the locations of the four notched-put portions 120 so that when the plastic portion 100 is placed on the housing 60 each notched-out portion 120 and its corresponding pocket 200 forms a generally circular hollowed-out section for receiving a post 130.

One end of the plastic portion 100 includes an enlarged portion 210 having a hole 220 therethrough which is in registry with two holes 80b and 80d in the housing 60 for receiving a rail 90b for attaching the housing 60 to the plastic portion 100. The other end includes a T-shaped portion 230 also having a hole 240 therethrough in registry with two holes 80a and 80c in the housing 60 for receiving the other rail 90a for further attaching the housing 60 to the plastic portion 100. Finally, the magnets 50a and 50b are placed in the hollowed-out portion 190 and are secured thereto by a suitable epoxy (not shown). It is instructive to note that the plastic portion 100 can move translationally on the rails 90a and 90b which, in turn, moves the magnets translationally.

Figure 3:
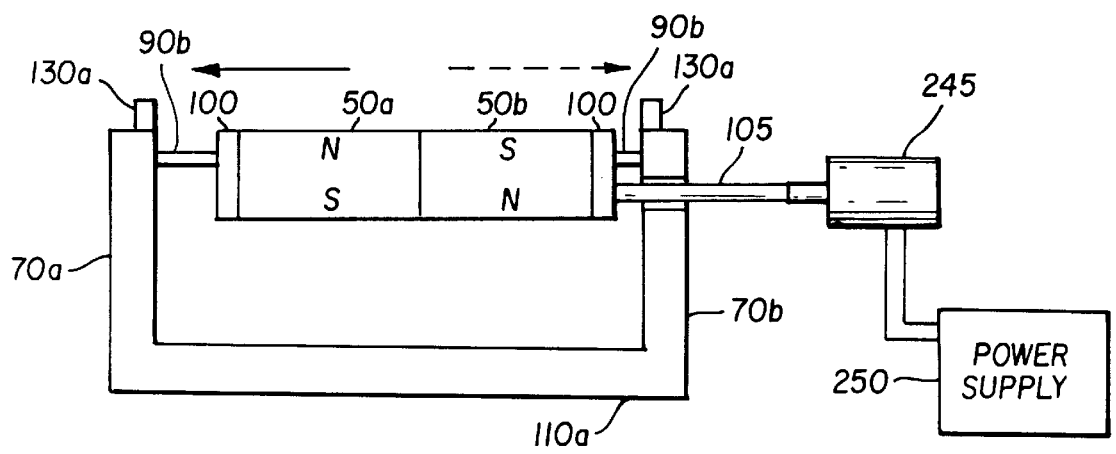
FIG. 3 is a view in vertical cross section of the bias-field device.

Referring to FIG. 3, an illustration of the operation of the bias-field device 40 is shown. The actuator 244 is energized by an external power supply 250 which, when energized, causes the shaft 105 to translationally move the plastic portion 100 laterally until the plastic portion 100 abuts the side 70a that prevents further movement in this direction, as illustrated by the solid arrow. Note that it is not necessary that both ends of plastic portion 100 travel along rails 90 at the same rate, only that the entire side of plastic portion 100 abuts side 70a when the translational movement is complete. The magnet 50a is attracted to the posts 130a and 130b for assisting in rapid lateral movement of the magnet 50 towards the desired side 70a or, in other words, a fast response time.

To move the magnet 50b towards the other side 70b, the actuator 245 is again energized which causes the magnets 50a and 50b to move translationally and laterally toward the other side 70b, as illustrated by the dashed arrow. It moves in the same manner as described above until the plastic portion 100 abuts the side 70b that prevents further movement in this direction. The posts 130c and 130d, similar to the other posts 130a and 130b, attract the magnets 50a and 50b in this direction for a fast response time.

Figure 4:
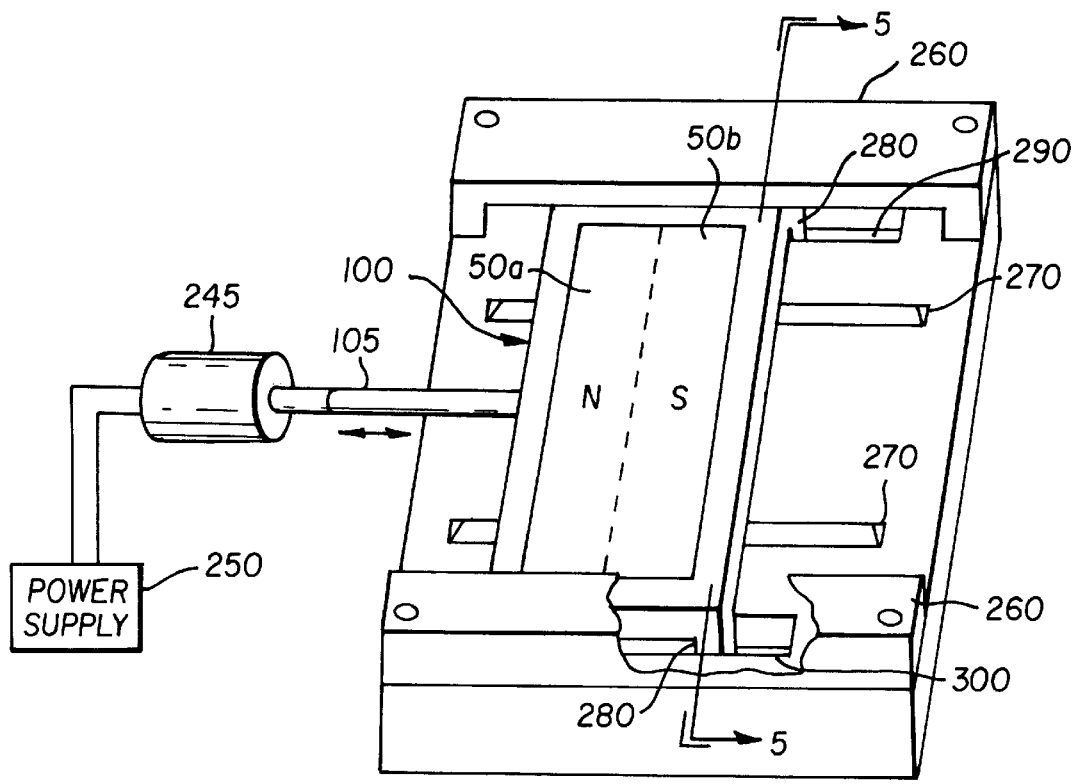
FIG. 4 is an alternative embodiment of the present invention.
Figure 5:
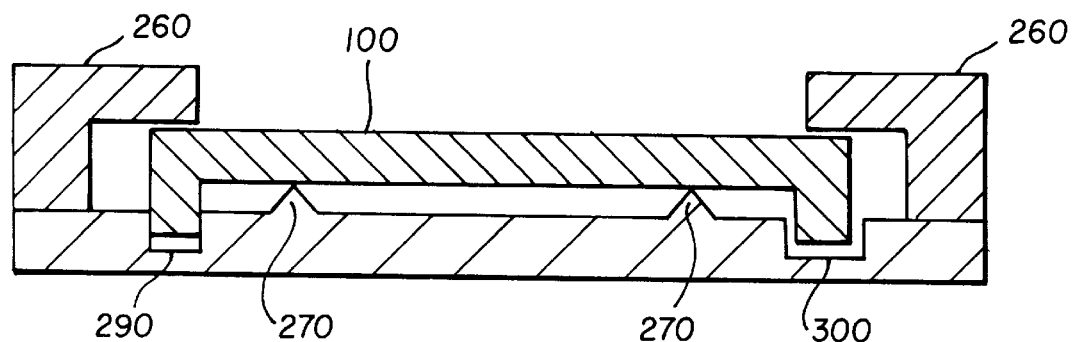
FIG. 5 is a cross-sectional view of FIG. 4.

Referring to FIGS. 4 and 5, there is illustrated an alternative embodiment of the present invention. In this embodiment, the side walls 70 of the preferred embodiment are eliminated and end portions 260 are added. Two low-friction rails 270 are positioned on the bottom portion 110, and the magnets 50 rests thereon for permitting lateral movement across the rails 270. Two downwardly extending lip portions 280 (only one is shown) are disposed respectively at each end of the plastic portion 100, and are respectively received by two spaced apart and parallel slots 290 and 300 in the bottom portion 110 for directing the plastic portion 100 translationally across the bottom portion. The operation of this embodiment is as in the preferred embodiment except that the magnets slid across the rails 270 and are guided by the slot 290. Slots 290 and 300 both provide lateral registration. Slot 300, having a greater width than slot 290, does not interfere with the guiding of portion 100 by slot 290.

The invention has been described with reference to a preferred embodiment. However, it will be appreciated that variations and modifications can be effected by a person of ordinary skill in the art without departing from the scope of the invention.

Parts List:

10 disk
20 recording layer
30 substrate
35 laser source
40 bias field device
50a magnet
50b magnet
60 housing
70 side
70a side
70b side
80 hole
80a hole
80b hole
80c hole
80d hole
80e hole 90 rail
90a rail
90b rail
100 plastic
105 shaft
110 housing bottom
120 notch
130 post
130a post
130b post
130c post
130d post
140 centerpiece
150 coil
170 lead ends
180 slot
190 hollowed-out center
200 pockets
210 enlarged portion
220 hole
230 t-shaped portion
240 hole
245 actuator
250 power supply
260 end portions
270 rails
280 lip portions
290 slot
300 slot

What is claimed is:

1. A translational, bias-field device for a magneto-optical system having a magneto-optical recording element moving through a magnetic field created by the bias-field device so that information is selectively recorded on or erased from the recording element, the device comprising:

(a) a housing;

(b) a first rail for enabling translational movement attached to said housing;

(c) a permanent magnet positioned adjacent the recording element for providing the magnetic field to the recording element, and attached to said first rail which enables translational movement of said magnet; and (d) a mechanical driver attached to said magnet which driver imparts movement said permanent magnet.

2. The device as in claim 1 further comprising a second rail positioned in a spaced apart relationship with said first rail, and both said rails disposed substantially parallel to each other and supported by said housing.

3. The device as in claim 2, wherein said magnet is encased with a plastic having low friction characteristics, and said plastic is operatively supported by said rails for providing substantially unrestricted movement of said magnet along said rails.

4. The device as in claim 3, wherein said housing includes a generally U-shaped cross section, and said rails are respectively disposed through opposite ends of said support structure.

5. The device as in claim 4, wherein said housing includes two walls in a substantially parallel, spaced apart relationship, and said rails extend respectively through said walls in a spaced apart, substantially parallel relationship with each other.

6. The device as in claim 5 further comprising two posts respectively disposed in each wall for assisting in providing rapid movement of said magnet along said bars.

7. The device as in claim 1, wherein said mechanical driver is an actuator that is attached to said magnet.

* * * * *